United States Patent [19]
Droste et al.

[11] Patent Number: 5,848,959
[45] Date of Patent: Dec. 15, 1998

[54] LUBICATED VERTICAL TRANSMISSION SHAFT FOR DRIVING A CENTRIFUGAL DRUM

[75] Inventors: Johannes Droste; Wilfried Mackel, both of Oelde; Markus Ruwe, Bielefeld, all of Germany

[73] Assignee: Westfalia Separator Aktiengesellschaft, Oelde, Germany

[21] Appl. No.: 703,558

[22] Filed: Aug. 27, 1996

Related U.S. Application Data

[63] Continuation of PCT/EP95/00349, Feb. 1, 1995 published as WO95/24271, Sep. 14, 1995.

[30] Foreign Application Priority Data

Mar. 11, 1994 [DE] Germany .......................... 44 08 182.0

[51] Int. Cl.⁶ .............................. B04B 15/00; F16N 7/36; F16C 33/66
[52] U.S. Cl. ................................ 494/15; 494/82; 494/83; 184/6.18; 184/6.26
[58] Field of Search .................................. 494/15, 43, 82, 494/83, 84; 184/6.16, 6.18, 6.26, 11.1, 13.1; 210/144, 363; 68/23.1, 23.3

[56] References Cited

U.S. PATENT DOCUMENTS

| 529,664 | 11/1894 | Naylor, Jr. ................................. 494/15 |
| 1,461,031 | 7/1923 | Feldmeier ................................. 494/15 |
| 4,457,745 | 7/1984 | Broker et al. ............................. 494/15 |

FOREIGN PATENT DOCUMENTS

| 215585 | 3/1987 | European Pat. Off. ................. 494/15 |
| 804144 | 11/1958 | United Kingdom ..................... 494/83 |

*Primary Examiner*—Charles E. Cooley
*Attorney, Agent, or Firm*—Sprung, Kramer, Schaefer & Briscoe

[57] ABSTRACT

A mechanism for driving a centrifuge drum has a shaft housing and a vertical transmission shaft having an upper end on which a centrifuge drum is mountable. Upper and lower bearings mount the shaft for rotation in the shaft housing. A wheel is mounted on the shaft for rotation therewith and a drive belt rotates the shaft via the wheel. An oil pool provides an oil mist for lubricating the upper bearing. The lower bearing is immersed in the oil pool and the wheel is mounted on the shaft above the upper bearing.

9 Claims, 2 Drawing Sheets

LUBRICATED VERTICAL TRANSMISSION SHAFT FOR DRIVING A CENTRIFUGAL DRUM

This is a continuation of International Application PCT/EP95/00349, with an international filing date of Feb. 1, 1995, published as WO95/24271 Sep. 14, 1995 now abandoned.

BACKGROUND OF THE INVENTION

The present invention concerns a mechanism for driving a centrifuge drum mounted on the upper end of a vertical transmission shaft. The shaft rotates in a housing in two bearing points, one above the other. A wheel is mounted tight to the shaft and a belt rotates the shaft by way of the wheel. The upper bearing point is lubricated with an oil mist obtained from a central pool.

A mechanism of this type is known from EP 0 215 585 B1 for example. The belt wheel is below the lower bearing point. The two bearing points are provided with oil by a rotating component connected to the shaft below the lower bearing point and immersed in the oil pool. The mist must travel through the lower bearing point before reaching the upper bearing point. The upper bearing point may accordingly not receive enough oil. The rotating shaft extends through the bottom of the pool, which is stationary, at the requisite radial interval, resulting in a gap that communicates with the atmosphere. The mist can leak through the gap, leading to malfunctions of the belt and wheel. The motion of the vessel can considerably increase such a leak when the mechanism is employed on board a ship.

SUMMARY OF THE INVENTION

The object of the present invention is accordingly a mechanism of the aforesaid type wherein the bearing points are reliably provided with oil without detriment to the mechanism's function.

This object is attained in accordance with the present invention in a mechanism of the aforesaid genus in that the lower bearing point is immersed in the pool and in that the wheel is mounted on the shaft above the upper bearing point.

The mist will accordingly be generated by the lower bearing point and can penetrate unimpeded to the upper bearing point. Since the belt is above the upper bearing point, the bottom of the pool can be solid and will not leak. Leakage at the upper bearing point is considerably less likely because the mist is much thinner there and because gravity will counteract the tendency to leak, Advantageous embodiments of the present invention are described herein.

The bearing points in one advantageous embodiment are accommodated in a common housing that is attached to the shaft housing by at least one resilient component. The resilient component functions as an articulation in the vicinity of the upper bearing point, allowing radial displacement of the lower bearing point. The common bearing-point housing allows a particularly thorough supply of oil to the upper bearing point and constitutes a particularly simple means of counteracting disequilibrium in the rotor.

The resilient component can be a ring of resilient material interposed concentrically between the shaft housing and the bearing-point housing. Several resilient components can alternatively be employed in the form of rubber-and-metal bearings distributed along the circumference of the bearing-point housing and attached to the shaft housing. Such components are inexpensive to manufacture or obtain and can easily be provided with the requisite characteristics.

Additional resilient components are provided between the shaft housing and the bearing-point housing in another advantageous embodiment to counteract the radial displacement of the lower bearing point. The additional resilient components help to stabilize the rotation of the drum.

The additional resilient components can be rubber bearings in the vicinity of the upper bearing point. Such rubber bearing are commercially available and accordingly inexpensive.

The additional resilient components can alternatively be cylindrical springs in the vicinity of the lower bearing point. Since the lower bearing point is immersed in oil, friction will be very low. If suppressors are necessary, friction suppressors or hydraulic suppressors for example, they can be immersed in the oil to reduce wear and save expense. Displacement of the bearing-point housing can also be handled within the oil pool with very little wear.

The transmission shaft in another advantageous embodiment is provided with, and drives, a rotating component above the lower bearing point. The rotating component reinforces the flow of oil generated by the lower bearing point.

The flow of oil to the upper bearing point can be regulated by providing the bearing-point housing with at least one outlet channel and one inlet channel that communicate with the pool of oil. More or less oil is returned directly to the pool in accordance with the position and dimensions of the outlet channel.

The flow of oil can be augmented by providing the top of the rotating component with a surface that induces a pumping action.

Various embodiments of the present invention will now be specified with reference to the accompanying drawing, wherein

DETAILED DESCRIPTION OF THE INVENTION

Figure 1:
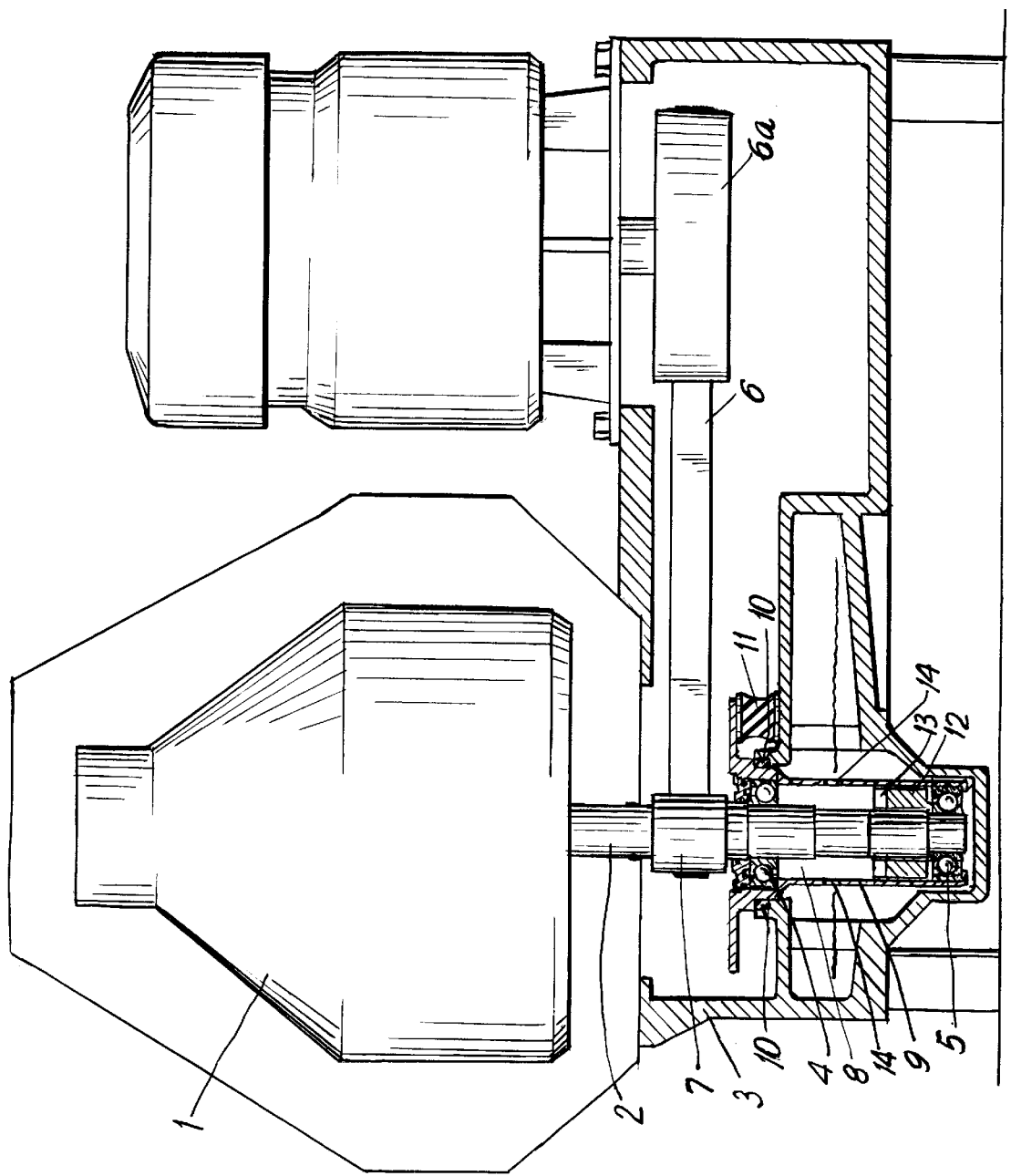
FIG. 1 is a cross-section through a centrifuge according to the invention.

The centrifuge drum 1 illustrated in FIG. 1 is mounted on the top of a vertical transmission shaft 2. Shaft 2 rotates between an upper bearing point 4 and a lower bearing point 5 in a shaft housing 3. Mounted tight on shaft 2 above upper bearing point 4 is a wheel 7. A belt 6 driven by motor 6a engages wheel 7 and accordingly rotates shaft 2. Lower bearing point 5 is immersed in the center of a pool of oil 8. Bearing points 4 and 5 are accommodated in a common housing 9. Bearing-point housing 9 is connected to shaft housing 3 by an intermediate resilient component 10 in the form of a concentric ring. Between shaft housing 3 and bearing-point housing 9 in the vicinity of upper bearing point 4 are additional resilient components 11 in the form of rubber bearings. Additional resilient components 11 counteract the radial displacement of lower bearing point 5. A component 12 is mounted tight on the section of shaft 2 above lower bearing point 5 and rotates along with it. The upper surface 13 of component 12 generates a pumping action as the component rotates. Bearing-point housing 9 communicates with oil 8 through outlet channels 14.

Lower bearing point 5 is immersed in oil 8, and its rotation generates a mist of oil. The mist is augmented by rotating component 12. A film of oil travels up to upper bearing point 4 along the inner surface of bearing-point housing 9. This flow of oil is regulated by the outlet channels 14 in the wall of bearing point housing 9, which return some of the oil to the pool before it can reach upper bearing point 4. Even if upper bearing point 4 leaks, accordingly, no oil will get to belt 6 because gravity will return it to the bottom of shaft housing 3. A resilient component 10 in the form of a concentric ring is a simple means of establishing the necessary connection between housings 3 and 9. Additional resilient components 11 counteract the displacement of lower bearing point 5 and help to ensure the stable rotation of drum 1.

Figure 2:
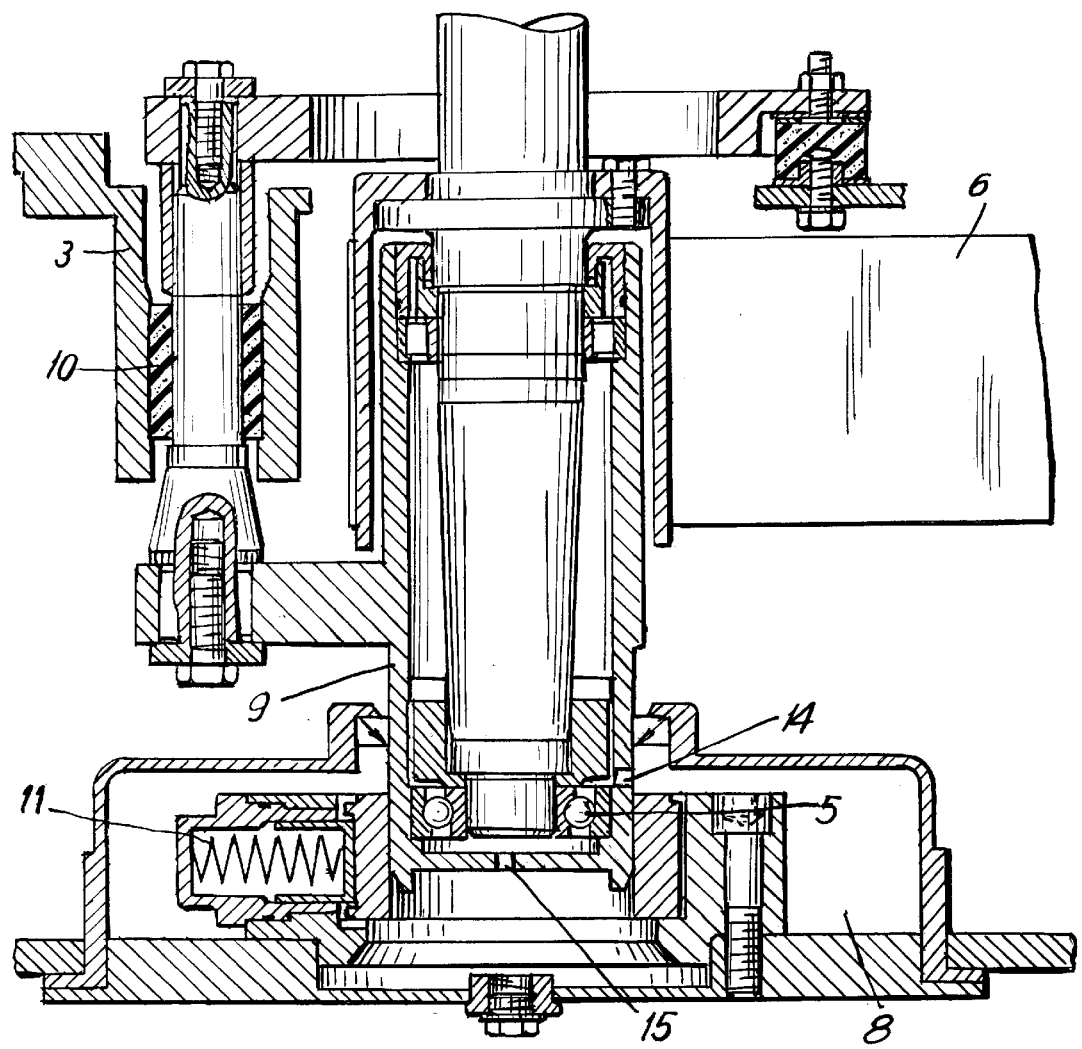
FIG. 2 is a cross-section through a bearing-point housing of FIG. 1.

The embodiment illustrated in FIG. 2 includes several resilient components 10 in the form of rubber-and-metal bearings distributed along the circumference of bearing-point housing 9 and in contact with shaft housing 3. An articulation between housings 3 and 9 is established in the horizontal plane extending through the midsection of resilient components 10. Since belt 6 also extends along this plane, there will be no torque in relation to the articulation to generate an undesired displacement of lower bearing point 5. Additional resilient components 11, in the form of cylindrical springs in the vicinity of lower bearing point, will need to counteract only the displacements of bearing-point housing 9 resulting from the disequilibrium of drum 1. The bearing will accordingly be extremely easy to adjust. Bearing-point housing 9 communicates with oil 8 through outlet channels 14 and an intake channel 15.

We claim:

1. A mechanism for driving a centrifuge drum comprising: a shaft housing; a vertical transmission shaft having an upper end on which a centrifuge drum is mountable; upper and lower bearings disposed one above the other and mounting the shaft in the shaft housing for rotation; a wheel mounted on the shaft for rotation therewith; a belt drive for rotating the shaft via the wheel; an oil pool providing an oil mist for lubricating, wherein the lower bearing is immersed in the oil pool and wherein the wheel is mounted on the shaft above the upper bearing; and a common housing for the upper and lower bearings attached to the shaft housing with a plurality of resilient components distributed along a circumference of the common housing and attached to the shaft housing, wherein the plurality of resilient components are rubber and metal bearings.

2. A mechanism for driving a centrifuge drum comprising: a shaft housing; a vertical transmission shaft having an upper end on which a centrifuge drum is mountable; upper and lower bearings disposed one above the other and mounting the shaft in the shaft housing for rotation; a wheel mounted on the shaft for rotation therewith; a belt drive for rotating the shaft via the wheel; an oil pool providing an oil mist for lubricating, wherein the lower bearing is immersed in the oil pool and wherein the wheel is mounted on the shaft above the upper bearing; a common housing for the upper and lower bearings attached to the shaft housing with at least one resilient component; and additional resilient components disposed between the shaft housing and the common housing to counteract radial displacement of the lower bearing, wherein the additional resilient components are rubber bearings disposed in the vicinity of the upper bearing.

3. A mechanism for driving a centrifuge drum comprising: a shaft housing; a vertical transmission shaft having an upper end on which a centrifuge drum is mountable; upper and lower bearings disposed one above the other and mounting the shaft in the shaft housing for rotation; a wheel mounted on the shaft for rotation therewith; a belt drive for rotating the shaft via the wheel; an oil pool providing an oil mist for lubricating, wherein the lower bearing is immersed in the oil pool and wherein the wheel is mounted on the shaft above the upper bearing; a common housing for the upper and lower bearings attached to the shaft housing with at least one resilient component; and additional resilient components disposed between the shaft housing and the common housing to counteract radial displacement of the lower bearing, wherein the additional resilient components are cylindrical springs disposed in the vicinity of the lower bearing.

4. A mechanism for driving a centrifuge drum comprising: a shaft housing; a vertical transmission shaft having an upper end on which a centrifuge drum is mountable; upper and lower bearings disposed one above the other and mounting the shaft in the shaft housing for rotation; a wheel mounted on the shaft for rotation therewith; a belt drive for rotating the shaft via the wheel; an oil pool providing an oil mist for lubricating, wherein the lower bearing is immersed in the oil pool and wherein the wheel is mounted on the shaft above the upper bearing; and a common housing for the upper and lower bearings attached to the shaft housing with at least one resilient component; wherein the common housing has at least one outlet channel and at least one inlet channel that communicate with the pool of oil.

5. The mechanism as in claim 4, wherein the at least one resilient component is a ring of resilient material interposed concentrically between the shaft housing and the common housing.

6. The mechanism as in claim 4, comprising a plurality of resilient components distributed along a circumference of the common housing and attached to the shaft housing.

7. The mechanism as in claim 4, further comprising additional resilient components disposed between the shaft housing and the common housing to counteract radial displacement of the lower bearing.

8. The mechanism as in claim 4, further comprising a rotating component on the transmission shaft above the lower bearing and driven by the shaft.

9. The mechanism as in claim 8, wherein a top of the rotating component has a surface inducing a pumping action.

* * * * *